US011920405B2

(12) United States Patent
Robinson et al.

(10) Patent No.: US 11,920,405 B2
(45) **Date of Patent: *Mar. 5, 2024**

(54) SHAKER DOORS WITH SOLID CORE AND METHODS FOR MAKING THEREOF

(71) Applicant: Masonite Corporation, Tampa, FL (US)

(72) Inventors: John Robinson, Wahpeton, ND (US); Steven B. Swartzmiller, Batavia, IL (US); Steven Gutkowski, Oswego, IL (US); Robert C. Allen, Elburn, IL (US); Roland Karsch, Geneva, IL (US); Michael Macdonald, Batavia, IL (US)

(73) Assignee: MASONITE CORPORATION, Tampa, FL (US)

(*) Notice: Subject to any disclaimer, the term of this patent is extended or adjusted under 35 U.S.C. 154(b) by 20 days.

This patent is subject to a terminal disclaimer.

(21) Appl. No.: 17/682,411

(22) Filed: Feb. 28, 2022

(65) Prior Publication Data

US 2022/0178196 A1 Jun. 9, 2022

Related U.S. Application Data

(60) Continuation of application No. 17/001,838, filed on Aug. 25, 2020, now Pat. No. 11,261,652, which is a division of application No. 16/552,058, filed on Aug. 27, 2019, now Pat. No. 10,753,140, which is a division of application No. 15/365,106, filed on Nov. 30, 2016, now Pat. No. 10,392,857.

(Continued)

(51) Int. Cl.
*E04C 2/54* (2006.01)
*E06B 3/70* (2006.01)
*E06B 3/72* (2006.01)

(52) U.S. Cl.
CPC .......... *E06B 3/7015* (2013.01); *E06B 3/7001* (2013.01); *E06B 3/72* (2013.01); *E06B 2003/7019* (2013.01); *E06B 2003/7025* (2013.01); *E06B 2003/7032* (2013.01); *E06B 2003/7036* (2013.01); *E06B 2003/704* (2013.01); *E06B 2003/7042* (2013.01)

(58) Field of Classification Search
CPC ........ E06B 3/7015; E06B 3/7001; E06B 3/72; E06B 2003/704
See application file for complete search history.

(56) References Cited

U.S. PATENT DOCUMENTS 4,746,555 A 5/1988 Luckanuck
4,811,538 A 3/1989 Lehnert et al.

(Continued)

FOREIGN PATENT DOCUMENTS

EP 1190825 A2 3/2002

*Primary Examiner* — Basil S Katcheves

(74) *Attorney, Agent, or Firm* — CANTOR COLBURN LLP

(57) ABSTRACT

The present invention relates to shaker doors with solid cores and methods for making the same. The shaker doors contain different core materials at the recessed panel than the raise peripheral region to provide dimensional stability and reduced distortion when the doors are exposed to high humidity. The devices and methods also provide for easy assembly of solid core shaker doors, including fire rated doors.

17 Claims, 11 Drawing Sheets

Related U.S. Application Data

(60) Provisional application No. 62/260,998, filed on Nov. 30, 2015.

(56) References Cited

U.S. PATENT DOCUMENTS

| | | | | |
|---|---|---|---|---|
| 5,355,654 | A | 10/1994 | Stanley | |
| 5,417,024 | A | 5/1995 | San Paolo | |
| 5,522,195 | A | 6/1996 | Bargen | |
| 5,787,677 | A * | 8/1998 | Bolich | E06B 3/7001 52/789.1 |
| 5,887,402 | A * | 3/1999 | Ruggie | B32B 3/30 52/794.1 |
| 6,341,461 | B1 | 1/2002 | Crowley et al. | |
| 6,764,434 | B1 | 7/2004 | Volk | |
| 6,764,625 | B2 * | 7/2004 | Walsh | B27N 5/00 264/109 |
| 6,886,306 | B2 | 5/2005 | Churchill et al. | |
| 7,279,437 | B2 | 10/2007 | Kai et al. | |
| 7,655,580 | B2 | 2/2010 | Majors | |
| 7,819,163 | B2 | 10/2010 | Tyler | |
| 8,058,193 | B2 | 11/2011 | Clark et al. | |
| 8,097,544 | B2 | 1/2012 | Majors | |
| 8,226,788 | B1 * | 7/2012 | Quinif | E06B 3/7001 156/212 |
| 8,341,919 | B2 | 1/2013 | Hardwick et al. | |
| 10,301,869 | B1 * | 5/2019 | Crittenden | E06B 7/10 |
| 10,392,857 | B2 * | 8/2019 | Robinson | E06B 3/72 |
| 10,753,140 | B2 * | 8/2020 | Robinson | E06B 3/72 |
| 11,261,652 | B2 | 3/2022 | Robinson et al. | |
| 2004/0032054 | A1 | 2/2004 | Moeller et al. | |
| 2005/0016121 | A1 * | 1/2005 | Hardwick | E06B 3/7015 52/749.1 |
| 2010/0024309 | A1 * | 2/2010 | Tavarez | E05B 9/04 49/501 |
| 2010/0183838 | A1 | 7/2010 | Coronado | |
| 2010/0257802 | A1 * | 10/2010 | Strickland | E06B 3/7015 52/404.3 |
| 2011/0000167 | A1 | 1/2011 | Dimke | |
| 2011/0206870 | A1 * | 8/2011 | Aravamudan | B28B 23/0006 428/15 |
| 2011/0271625 | A1 | 11/2011 | Clark et al. | |
| 2011/0296793 | A1 * | 12/2011 | Hardwick | B27N 3/00 52/784.1 |
| 2013/0167474 | A1 * | 7/2013 | Carlson | F25D 23/028 52/784.15 |
| 2014/0261991 | A1 | 9/2014 | Cucchi et al. | |
| 2019/0277082 | A1 * | 9/2019 | Millard | B32B 7/12 |

* cited by examiner

SHAKER DOORS WITH SOLID CORE AND METHODS FOR MAKING THEREOF

CROSS-REFERENCE TO RELATED APPLICATIONS AND CLAIM TO PRIORITY

This application is a continuation of U.S. patent application Ser. No. 17/001,838, filed Aug. 25, 2020, now U.S. Pat. No. 11,261,652, which is a divisional of U.S. patent application Ser. No. 16/552,058, filed Aug. 27, 2019, now U.S. Pat. No. 10,753,140, which is a divisional of U.S. patent application Ser. No. 15/365,106, filed Nov. 30, 2016, now U.S. Pat. No. 10,392,857, which claims priority to U.S. Provisional Patent Application No. 62/260,998, filed Nov. 30, 2015, which is incorporated herein by reference.

FIELD OF THE INVENTION

The present invention relates to doors with solid cores, preferably shaker doors with solid cores, and methods for making the same. The devices and methods provide for simplified assembly of solid core shaker doors, including fire rated doors.

BACKGROUND

Doors having wood composite molded door facings are well known in the art. Typically, a perimeter frame is provided, which includes first and second vertically extending stiles and at least first and second horizontally extending rails attached together, frequently by an adhesive such as polyvinyl acetate, to form a rectangular frame. A lock block may also be utilized to provide further support for a door handle and/or a locking mechanism at the periphery of the door. The lock block is preferably secured to a stile and/or a rail. Door facings are adhesively secured to opposite sides of the frame, and the door facings (also known as door skins) typically are identical in appearance.

The resulting door includes a void or hollow space defined by the opposing door facings and perimeter frame. This void typically causes the door to be lighter than a comparably, sized solid, natural wood door, which is not as desirable for many consumers. In addition, the sound and/or heat insulation provided by such doors may not be satisfactory. Therefore, it is often desirable to use a core material (e.g., core pieces or components) to fill the hollow space.

A suitable core material should provide the door with a desirable weight, for example the weight of a similarly-styled natural solid wood door. In addition, a core material should provide the door with a relatively even weight distribution. The core material should also be configured to match the dimensions of the interior space defined by the facings and frame with sufficiently close tolerances so that optimal structural integrity and insulation properties are achieved. The core material may also provide noise attenuation, thermal resistance and other properties that enhance the functionality of the door. Another function of the door core is to provide resistance to distortion. This distortion includes both distortion that might be built in to the door during assembly, and also distortion that might result later from exposure to moisture, for example.

Door facings may be molded from a planar cellulosic fiber mat to include one or more interior depressions or contours, such as one or more square or rectangular depressions which extend into the hollow space of a door assembly relative to the plane of an outermost exteriorly disposed surface of the door. For example, a door facing may include molded walls having a plurality of contours that include varied curved and planar surfaces that simulate a paneled door. One type of door facing commonly referred to as shaker or shaker-styled is characterized at least one rectangular depression in the door facing.

If the door facings are contoured to include one or more depressions, the interior void of the door assembly will have varying dimensions given the facings are secured to co-planar stiles and rails. When providing a core material or component within the void of a door assembly having such contoured facings, it is necessary to compensate for the varying dimensions of the void.

In the past, various materials, such as wheat board, corrugated cardboards, and/or paper, have been used as the core material. However, due to the contoured door facings, the thickness of the core material varies within a door, which may result in lowered strength and stability in the thinner areas (formed by depression in the door facing). As a result, the door may be susceptible to distortion, such as when it is exposed to high humidity. This is particularly true for a shaker door, due to the relatively large panel area.

Therefore, there remains a need for a shaker door that contains improved dimensional stability and reduced distortion when exposed to high humidity.

SUMMARY OF THE INVENTION

The present invention relates to doors with solid cores, preferably shaker doors with solid cores. Preferably, the shaker door is a one-panel shaker door, as illustrated in FIG. 1. The present invention provides core constructions that provide solid core shaker doors with improved dimensional stability and reduced distortion when exposed to high humidity.

In an aspect of the present invention, the core of the shaker door contains two different core densities. The relatively thin core material in the panel area has a higher density than the relatively thick core material in the raised peripheral region. The density of the thin core material is inversely proportional to the height difference between the thick core material and the thin core material. Preferably, the density of the thin core material is about 120 to about 250% greater than the density of the thick core material.

In another aspect of the present invention, the core material in the raised peripheral region contains three layers, where the middle layer is contiguous with the core material in the panel. The middle layer is formed by a thin core material (under the panel) substantially spanning the entire area of the door inside the frame at the thickness of the panel. Additional layers of material are then used to fill in the void in the raised peripheral region.

In a further aspect of the present invention, the thin core material extends slightly beyond the area under the centrally oriented panel. The remaining volume of the interior void may then be filled with at least a filler core material.

Methods for making the different aspects of the present invention are also provided.

Other aspects of the invention, including apparatus, devices, kits, processes, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In the drawings.

DETAILED DESCRIPTION

Figure 1:
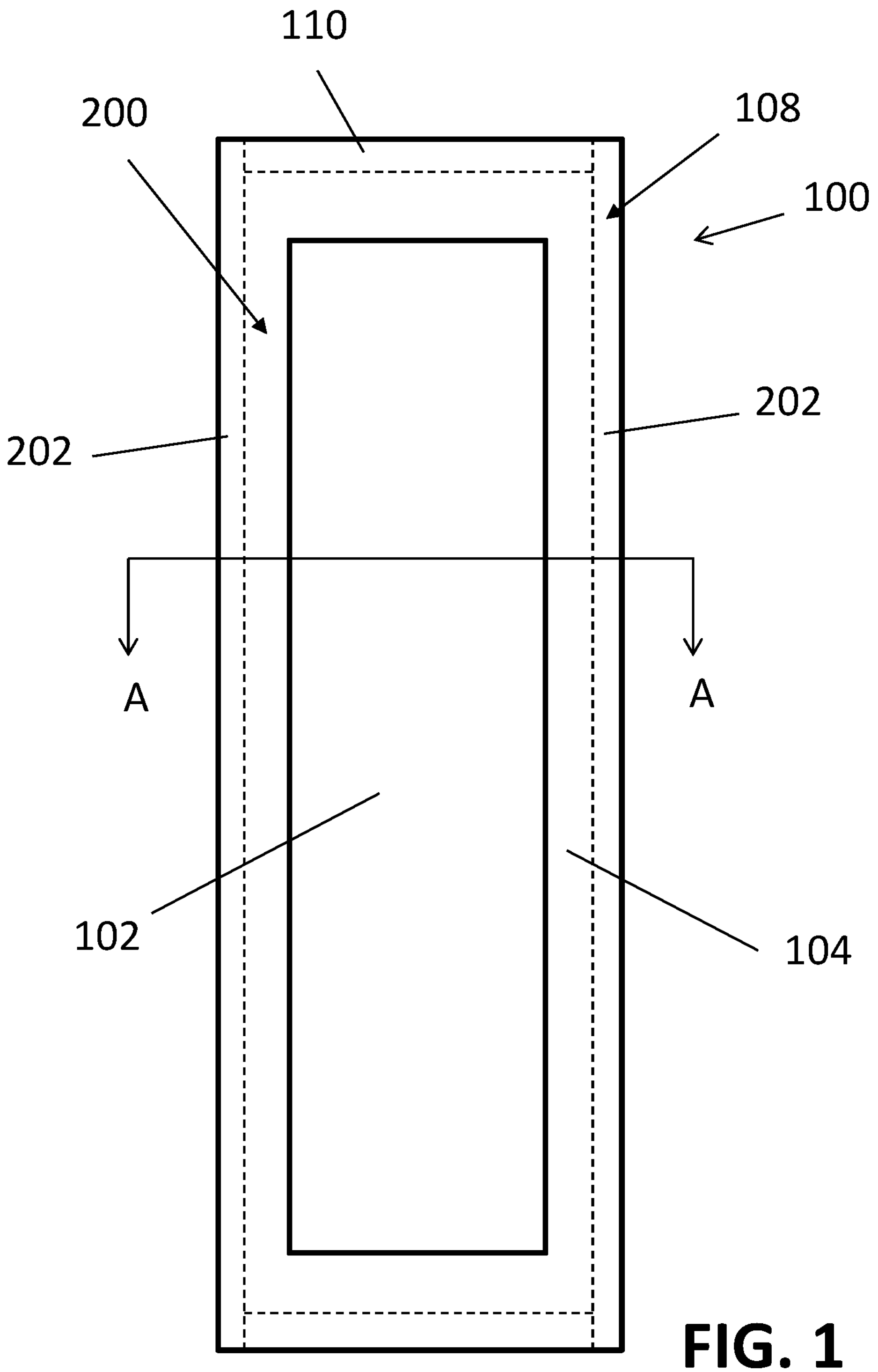
FIG. 1 shows a front elevational view of a one-panel shaker door.

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods. Like reference characters refer to like parts throughout the drawings.

Figure 2:
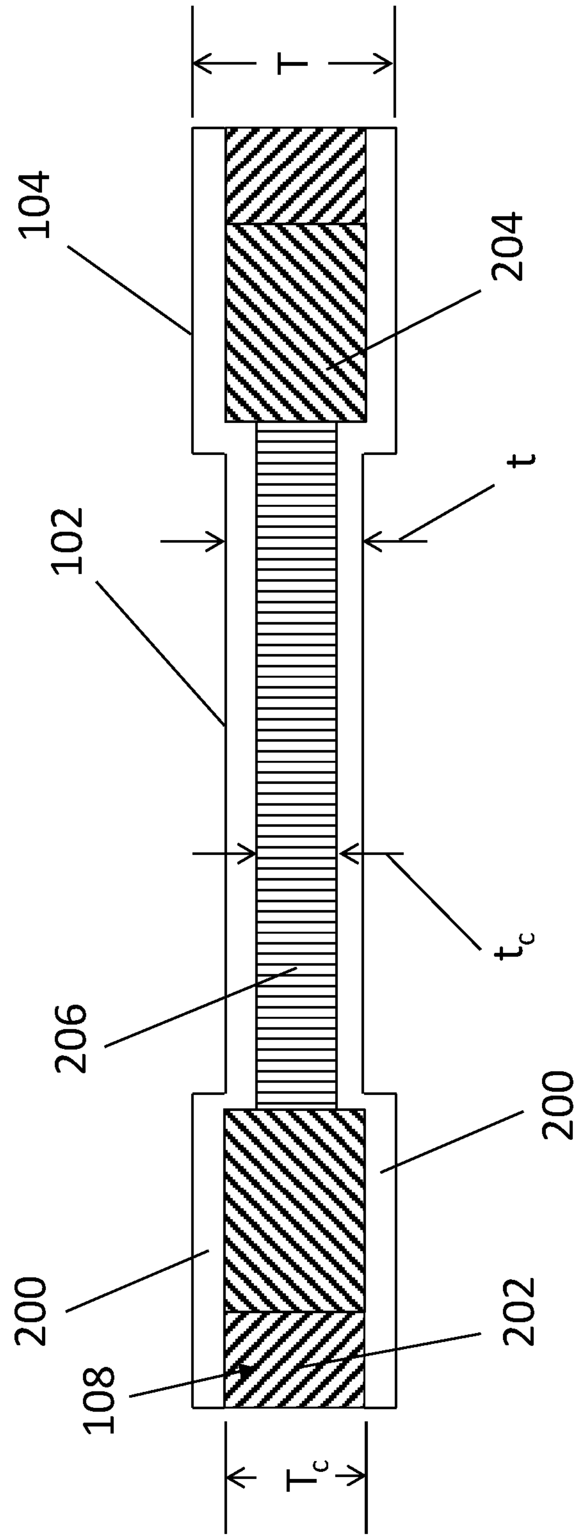
FIG. 2 shows a cross-section view at line A-A of FIG. 1 in accordance with a first embodiment of the present invention.

A shaker door 100, as best shown in FIGS. 1 and 2, contains at least one panel 102 that is recessed from and surrounded by a raised peripheral region 104. The door 100 preferably has a pair of opposed, identical door facings 200, each having a panel 102 and a peripheral region 104. The door facings 200 are secured to opposite sides of the peripheral door frame, so that the panels 102 and peripheral portions 104 are aligned with each other. The panel 102 is rectangular in shape with generally squared corners. While the transition between panel 102 and peripheral portion is illustrated as being squared, those skilled in the art will appreciate that the transition typically is formed by a contoured transition region, sometimes known as an ovolo, due to the molding process. The area within the panel 102 forms a planar surface that is recessed from the surface of the raised peripheral region 104. Due to the recessed panels 102, the thickness t of the door 100 at the aligned panels 102 is thinner than the thickness T at the aligned raised peripheral regions 104. In an exemplary embodiment, the thickness t of the door at the panels 102 is about 30 to about 50% of the thickness T at the raised peripheral regions 104, preferably about 30 to about 35%. Consequently, because the door facings 200 also have a thickness, the thickness $T_c$ of the thick core material 204 is less than the thickness T of the door 100, and the thickness $t_c$ of the thin core material 206 is less than the thickness t of the door 100. Because the thickness of the door facing 200 is relatively small, on the order of about 1.7 to about 3.2 mm, preferably about 2.8 to about 3.2 mm, the differences between T and $T_c$ is relatively minor, but the difference between t and $t_c$ may be significant. Preferably, for a non-fire rated door, the thickness $t_c$ at the panels 102 is about 0.370±0.005 inches (about 9.40±0.13 mm) and the thickness $T_c$ at the raised peripheral region is about 1.120±0.0625 inches (about 28.40±1.59 mm); and for a fire rated door, the thickness $t_c$ at the panels 102 is about 0.750±0.005 inches (about 19.5±0.13 mm) and the thickness $T_c$ at the raised peripheral regions 104 is about 1.75±0.0625 inches (about 44.45±1.59 mm).

As typical for cored doors, the door 100 is supported by a rectangular frame 108 containing two parallel stiles 202 attached at their respective ends to two parallel rails 110. Door facings 200 are attached to opposite sides of the frame to form a door. A core material fills the internal cavity inside the frame and between the door facings 200.

In a first embodiment of the present invention, the core is formed from materials having different densities. Referring to FIG. 2, a thick core material 204 fills the space under the between peripheral regions 104 and has a lower density than the thin core material 206 that fills the space beneath the recessed panels 102. In an exemplary embodiment, the density of the thin core material 206 under the panels 102 has a density that is about 120 to about 250% greater than the density of the thick core material 204 under the raised peripheral regions 104, preferably about 150 to about 185%, more preferably about 160 to about 180%. The thin core material 206 preferably has a density of about 25 to about 35 lbs/$ft^3$, more preferably about 29 to about 31 lbs/$ft^3$; and the thick core material 204 preferably has a density of about 13 to about 23 lbs/$ft^3$, more preferably about 17 to about 19 lbs/$ft^3$. Without being bound by any theory, it is believed that the higher density core material in the thinner portion of the core provides additional strength and stability to the overall door and allows it to resist distortion when exposed to high humidity.

In an exemplary embodiment, both the core materials 204 and 206 are made from wheat board, albeit manufactured to different thicknesses and densities. Wheat board is made from wheat stalks. Essentially, wheat straws are prepared by first shredding the straw bales and milling the straw to the desired fiber size range, preferably about 1/32 to about 1/4 inches (about 0.80 mm to about 6.35 mml) long. After shredding and milling, the milled fiber may be screened to remove fines and dried to a desired moisture content, preferably about 5 to about 8% moisture. Finally, the milled fiber is blended with an uncured resin binder, formed into a resin/fiber mat of a suitable thickness, and cured in a press at a suitable pressure and temperature, preferably in a press. In certain embodiments, the process may further include sanding and trimming the cured wheat board to a desired final thickness. As noted above for the present invention, the wheat boards are made with two different thicknesses, each having a different density. The thicker wheat board with lower density is used as the thick core material 204, and the thinner wheat board with higher density is used as the thin core material 206. Those skilled in the art recognize that density is inversely related to thickness for a mat after pressing. During formation of the wheat board, the thickness may be controlled by the distance between press platens. The desired thickness may be achieved by pressing to a hard stop, or by measuring the press platen separation during pressing. Alternatively, pressure may be used to control thickness. Further, once completed, the wheat boards may be sanded to reduce the desired thickness, although doing so does not vary the density of the pressed board. The desired density of the wheat boards may be controlled by the amount of material (milled fiber and resin binder) fed into the press for a given thickness. The more material is used the higher the density.

Alternatively, the core materials 204 and 206 may be made from other bio based materials, such as particleboard, oriented strand board (OSB), plywood, medium density fiberboard (MDF), plywood, and stave core. Synthetic materials, such as polystyrene and polyurethane may also be used as the core materials 204 and 206. The core material may be formulated to include a fire retardant, such as boric acid or a blend thereof, monoammonium phosphate, diammonium phosphate, magnesium hydroxide, zinc borate, alumina trihydrate, or combinations thereof.

Figure 10:
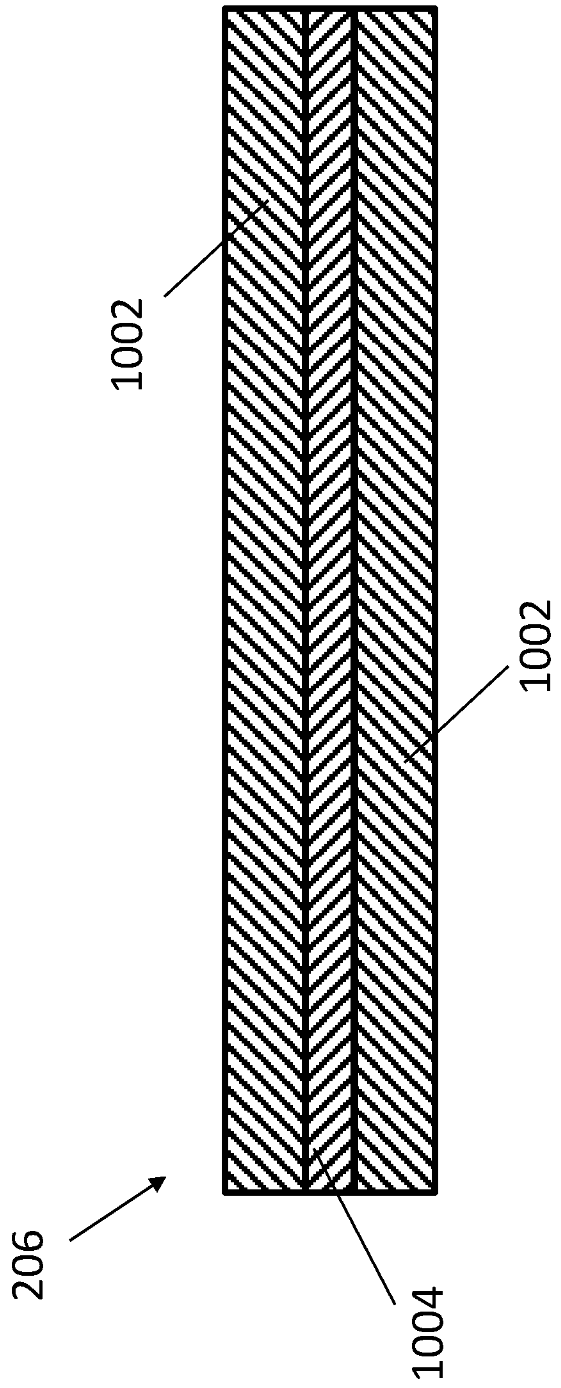
FIG. 10 shows the construction of an exemplary thin core material for a fire resistant door.
Figure 11:
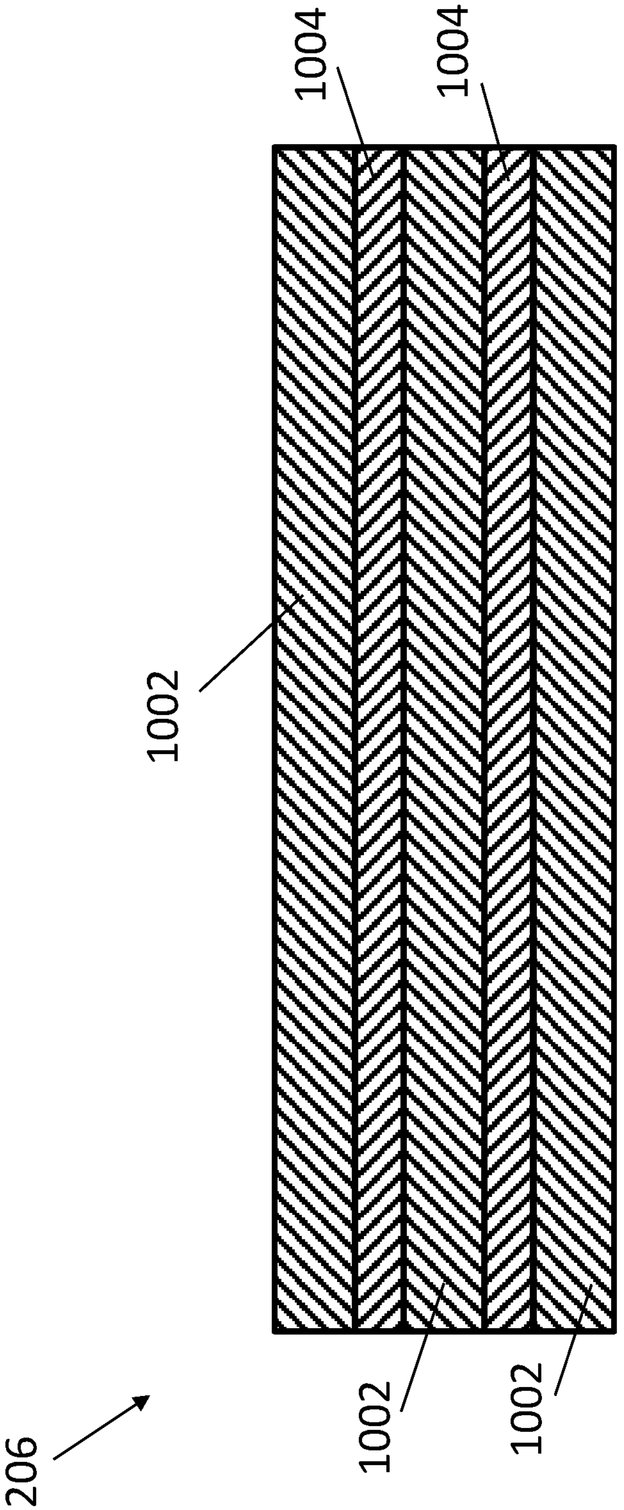
FIG. 11 show the construction of another exemplary thin core material for a fire resistant door.

For fire resistant doors, the thin core material 206 may be a mineral core material. Typically, mineral core material contains a composition including a mineral and a binder. The mineral may be, for example, sodium silicate (preferably in hydrated form), gypsum, perlite, vermiculite, calcium silicate, potassium silicate, or combinations thereof. The composition may also include fiberglass or wood fibers. In an embodiment, the mineral core material may contain a center layer of hydrated sodium silicate and binder, which is coated on both major surfaces with epoxy resin and reinforced with glass fibers, textile-glass fabric, and/or woven wires. In another embodiment, the mineral core material may contain a woven panel of fiberglass that is impregnated with hydrated sodium silicate. In that case, the sodium silicate itself may also serve as the binder. The mineral core material may be laminated to one or more MDF layers to achieve the desired thickness of the thin core material 206. For example, a ¾ inch thick thin core material 206 may be formed by laminating a ⅝ inch mineral core to a ⅛ inch MDF. More than one layer of mineral core and/or MDF may be used to produce the thin core material 206. For example, as illustrated in FIG. 10, the thin core material 206 may be formed by sandwiching a mineral core 1004 between two MDF layers 1002, or as illustrated in FIG. 11, by alternating layers of mineral cores 1004 and MDF layers 1002. Although MDF layer(s) are mentioned as examples, the layers may also be formed from other bio based materials, synthetic materials, or wheat board. Further, the position of the layers, as shown in FIGS. 10 and 11, may be interchanged, i.e., MDF layer 1002 being substituted for a mineral core 1004 and vice versa. Mineral cores disclosed in U.S. Pat. Nos. 5,522,195, 4,811,538, 4,746,555, 7,279,437, 7,655,580, and 8,097,544, which are incorporated herein by reference, may be appropriate for the present invention. Also, commercially available fire resistant materials, such as Palusol® from BASF and/or fire door core materials from Fyrewerks, Inc., are also appropriate for the present invention. Preferably, fire resistant doors pass 20, 45, 60, or 90 minute fire rating. Standard methods of fire tests of door assemblies are found in NFPA 252 (2012), UL10C (2016), and/or CAN/ULC-S104 (2015).

Figure 3:
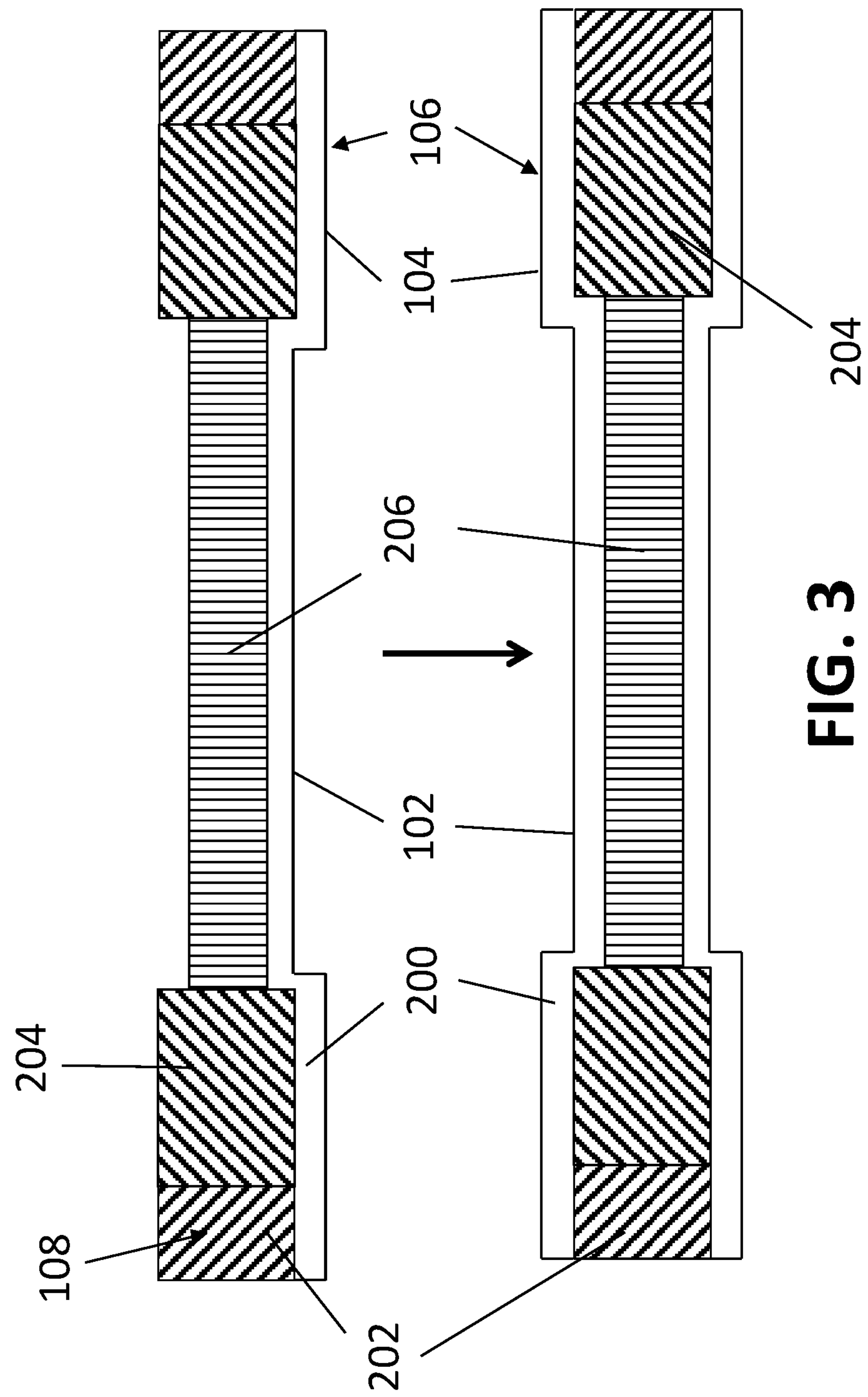
FIG. 3 shows steps in the construction of the shaker door in accordance with a first embodiment of the present invention (cross-section view at line A-A)

FIG. 3 illustrates a process for assembling the shaker door 100 of the present invention. The frame 108, including stiles 202, is first attached to the interior side of a first door facing 200, e.g. by an adhesive. The thick core material 204 is then placed over the interior side of the raised peripheral region 104 of the first door facing 200 and attached thereto, e.g. by an adhesive; and the thin core material 206 is place over the interior side of the recessed panel 102 and attached thereto, e.g. by an adhesive. Adhesive is then placed over the exposed side of the core materials 204, 206 and the frame. A second door facing 200 is then placed on top of the exposed adhesive, pressed against the frame and the core material 204, 206, and allowed to cure. In exemplary embodiments, curing may take place in a press to allow for proper bonding between the components of the shaker door 100. The processes disclosed in U.S. Pat. No. 7,819,163 and U.S. Patent Application publication No. 2014/0261991, which are incorporated herein by reference, may appropriately be used to assemble the shaker door 100 of the present invention.

Figure 4:
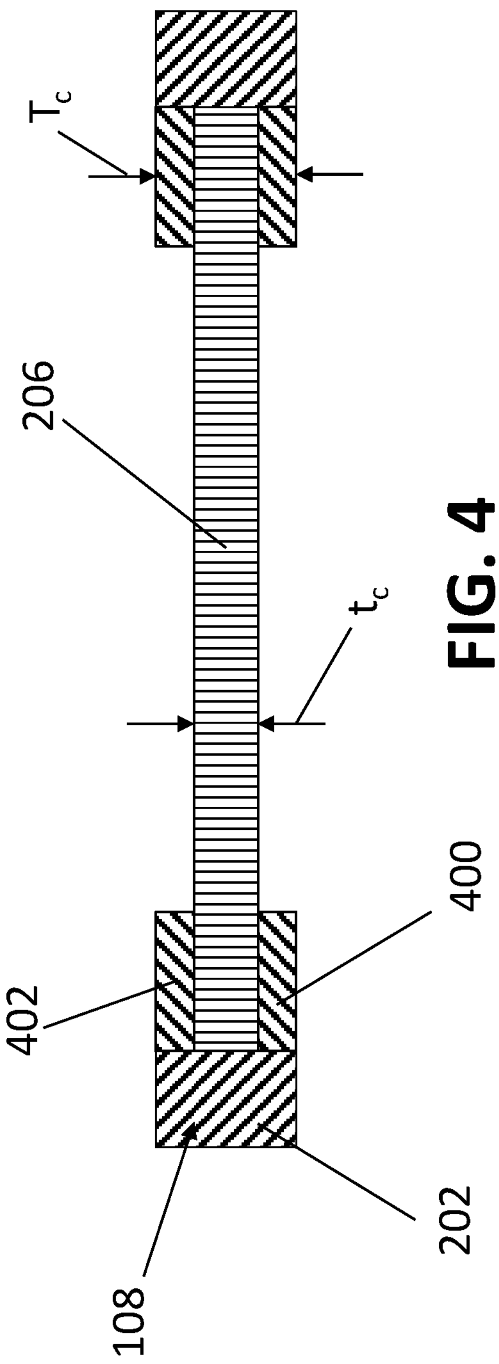
FIG. 4 shows a cross-section view at line A-A of a core in accordance with a second embodiment of the present invention.

A second embodiment of the present invention is illustrated in FIG. 4. That construction is particularly advantageous when the thickness $T_c$ is about three times the thickness $t_c$. The advantages of this embodiment include simplification of both production and inventory management as the same sheets of material may be used, and simplification of processing as the thickness setting on the glue machine, preferably a direct roll coater, does not need to be changed. As illustrated in FIG. 4, the thick section of the core which fills the space between the raised peripheral regions 104 is composed of three different layers of core materials 400, 206, 402. The core materials 400, 206, 402 may be the same or different. In the embodiment shown in FIG. 4, the thin core material 206 spans the entire area of the door 100 inside the frame 108, but only at the thickness $t_c$. The additional layers of material 400 (first filler layer), 402 (second filler layer) are used to fill in the cavity between the raised peripheral regions 104. Thus, the embodiment of FIG. 4 essentially replaces the single layer thick core material 204 of the embodiment of FIG. 2 with three layers of materials 400, 206, 402, where one of the layers (the middle layer 206) is an extension of and contiguous with the thin core material 206. The first and second filler layers 400 and 402 may be the same or different material as the thin core material 206. Other commonly used door support materials may be used for the thin core material 206, the first filler layer 400, and the second filler layer 402. In the embodiment of FIG. 4, the material of the filler layers 400 and 402 may be the same as that of the thin core material 206 but cut into strips to fit the into the space between the raised peripheral regions 104. One advantage of this embodiment is that small strips of the thin core material 206 may be reused to form the first and second filler layers 400 and 402. Another advantage is that broken or scrap pieces of materials may be trimmed into strips and salvaged to form the first and second filler layers 400 and 402. In certain embodiments, the filler layers 400 and 402 may not be as critical for bending resistance as the thin core material 206, so a weaker material may be used.

Figure 5:
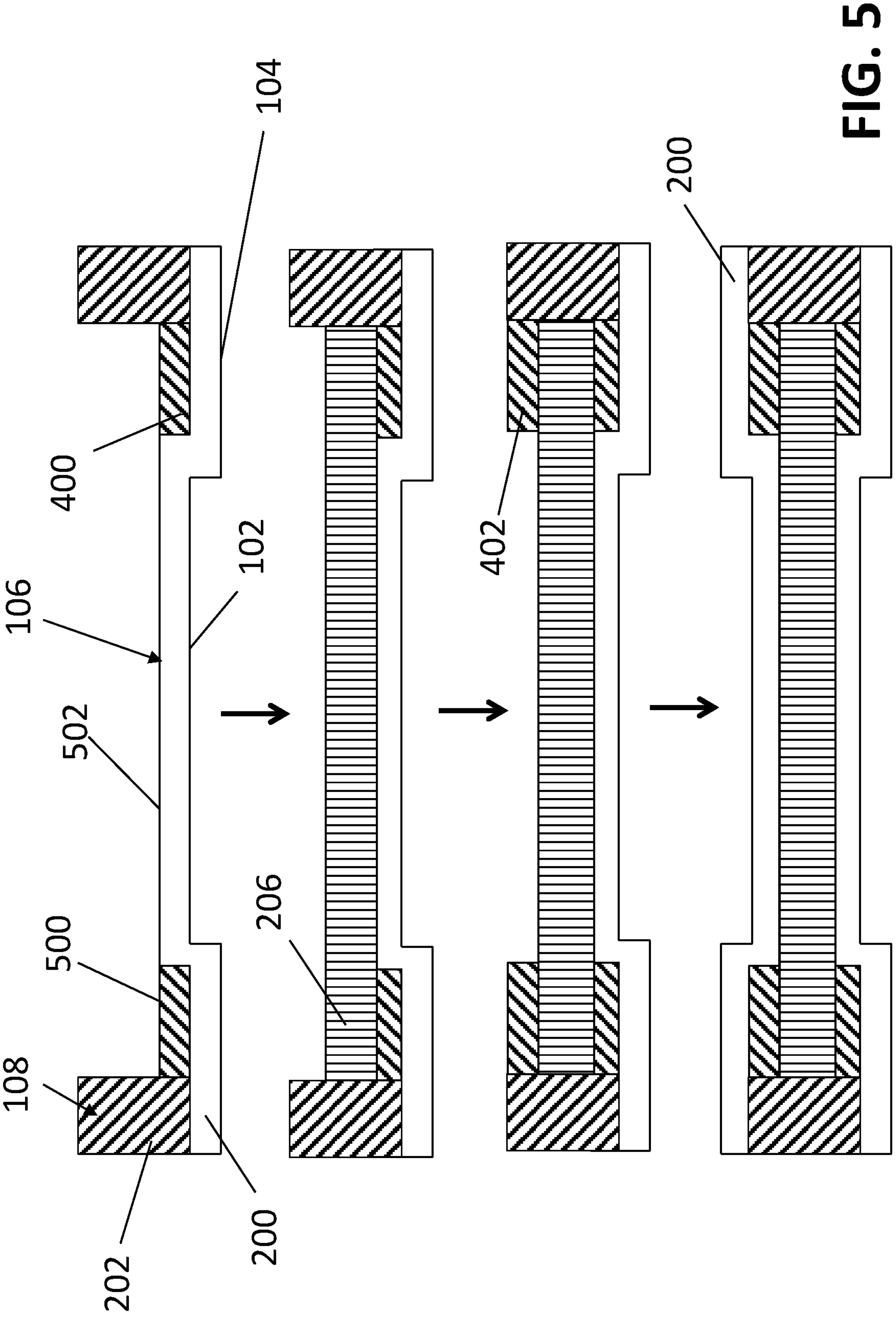
FIG. 5 shows steps in the construction of the shaker door in accordance with a second embodiment of the present invention (cross-section view at line A-A)

The assembly of the second embodiment, as shown in FIG. 5, may be accomplished as similarly described above and in FIG. 3, with some modification. The assembly of the core first involves laying strips of the first filler layer 400 on the raised peripheral region 104 and adjacent to the frame 108. The first filler layer 400 should be sufficiently thick so that it its exposed surface 500 is flush with the inner surface 502 of the recessed panel 102 of the door facing 200. Next, the thin core material 206, cut to fit the entire area within the frame, is laid onto the first filler layer 400 and the inner surface 502 of the recessed panel 102. Strips of the second filler layer 402 are then laid onto the thin core material 206, in the areas of the raised peripheral regions 104. Finally, another door facing 200 is then placed on top to complete the door 100. As noted above, the door facing 200 may be secured to the core and the frame, e.g., by an adhesive. Further, the components of the core itself, i.e. the first filler layer 400, the thin core material 206, and the second filler layer 402 may also be secured together, e.g., by using an adhesive. A preferable adhesive is polyvinyl acetate. In certain embodiments, it is desirable for the material of the filler layers 400, 402 to be compressible to accommodate the stacked tolerances of the three layers 400, 206, 402 in the raised peripheral region 104. Here each of the three layers, 400, 206, and 402 in the raised peripheral region 104 may contribute, for example, a tolerance of about ±0.005", which makes the total tolerance in that area about ±0.015", which is greater than the thin core material 206 (±0.005") in the recessed panel 102. The use of compressible materials for the filler layers 400, 402 allows the door to be designed with a single, lower tolerance. The compressible materials may be, for example, open cell foam, low density fiberboard, low density wheat straw board, or combinations thereof.

Figure 6:
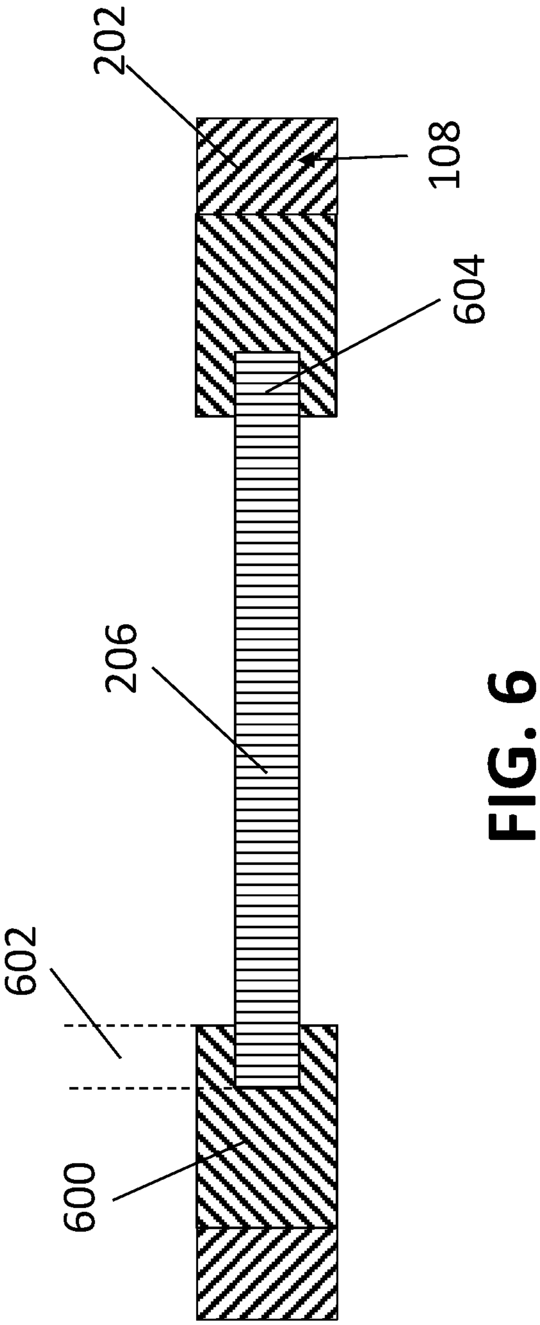
FIG. 6 shows a cross-section view at line A-A of a core in accordance with a third embodiment of the present invention.

A third embodiment of the present invention is illustrated in FIG. 6. In this embodiment, the thin core material 206 extends beyond the area under the recessed panel 102; however, that extension (overhang) 602 does not go as far as the frame 108. The overhang 602 (the portion of the thin core material 206 that extends beyond the area under the recess panel 102) may extend about 25 to about 50% of the distance between the recessed panel 102 and the frame 108. The amount of overhang depends on the final door requirements and may add ease of assembly and/or strength to the final door construction. Without being bound by any particular theory, it is believed that the overhang provides more bending stiffness to resist distortion. The remaining portion of the core, at the raised peripheral region 104, may be filled with at least a filler core material 600, which may be a conventional core material, such as particle board and/or non-expandable corrugated cardboard. In an exemplary embodiment, the filler core material 600 immediately above and below the thin core material 206 is preferably a paper honeycomb material or corrugate cardboard material, while the remaining volume is filled with particle board. The use of two different materials may be desirable to achieve weight reduction (e.g. by using a lower density material as the filler core material) or cost reduction (by using a less expensive material). In certain embodiments, other materials may be used, such as particle board and medium density fiberboard (MDF). In addition, the filler core material 600 may be the same material as described above for the thick core material 204 or any of the filler layers 400, 402. Similarly to the second embodiment, compressible materials may be desirably used here.

Figure 7:
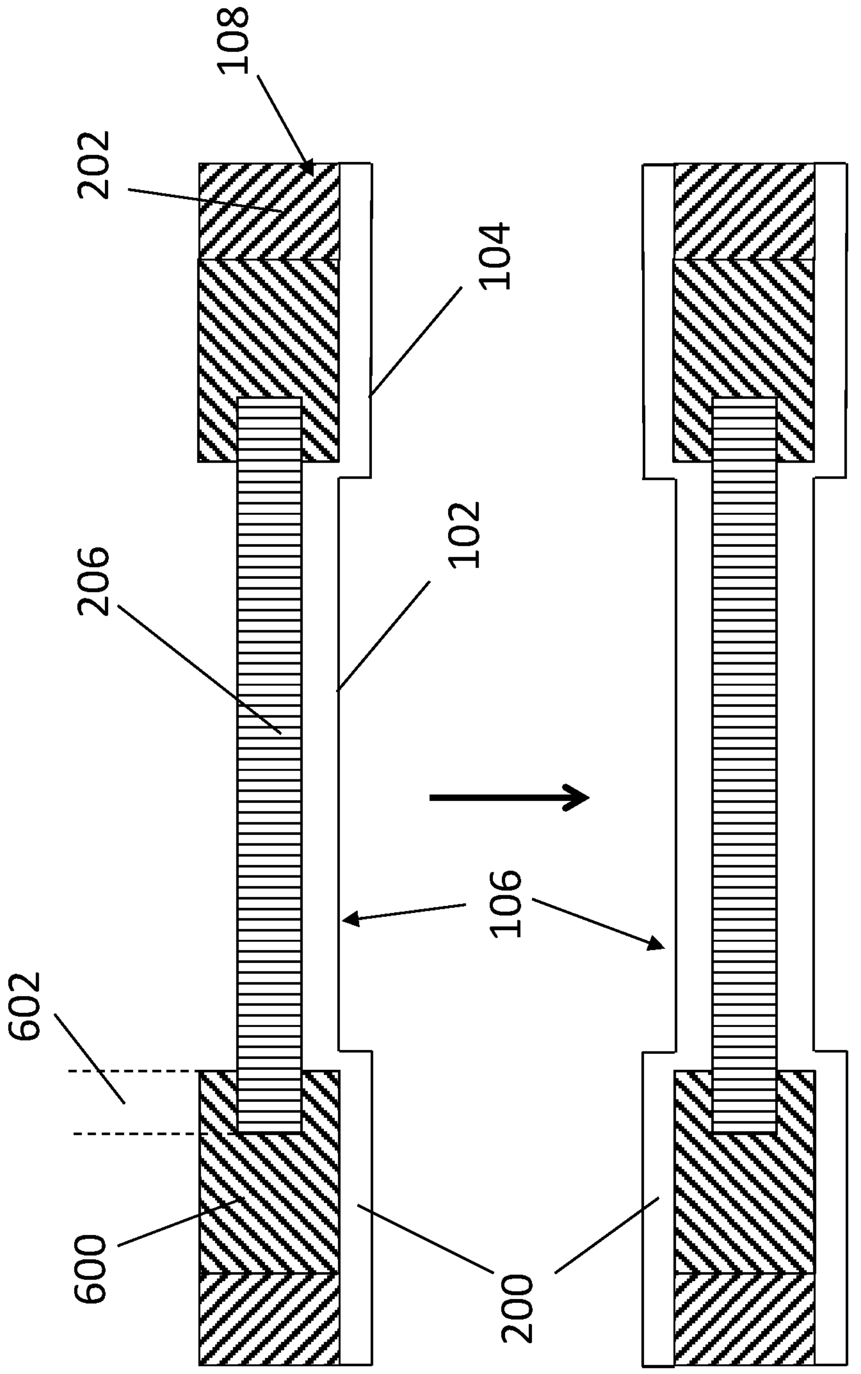
FIG. 7 shows steps in the construction of the shaker door in accordance with a third embodiment of the present invention (cross-section view at line A-A)

The assembly of the third embodiment, as shown in FIG. 7, may be accomplished as similarly described above and in FIG. 3, with some minor modification to the assembly of the core. The frame 108, including stiles 202, is first attached to the interior side of a first door facing 200, e.g. by an adhesive. The thin core material 206 and the filler core material 600 are placed over the interior side of the door facing 200 and attached thereto, e.g. by an adhesive. As illustrated in FIG. 7, the thin core material 206 is placed over the recessed panel 102, such that the thin core material 206 extends beyond the recessed panel 102 and interlocks with the filler core material 600, such as through a tongue and groove fitting. The filler core material 600 may be formed, e.g. by routing, to provide a channel 604 in the tiller core material 600 to accommodate the overhang 602 of the thin core material 206. Here, the overhang 602 fits into the channel 604 in the filler core material 600 to lock the thin core and filler core materials 206, 600 together. Adhesive is then placed over the exposed side of the core materials 206, 600 and the frame. A second door facing 200 is then placed on top of the exposed adhesive and allowed to cure as previously herein described.

Figure 8:
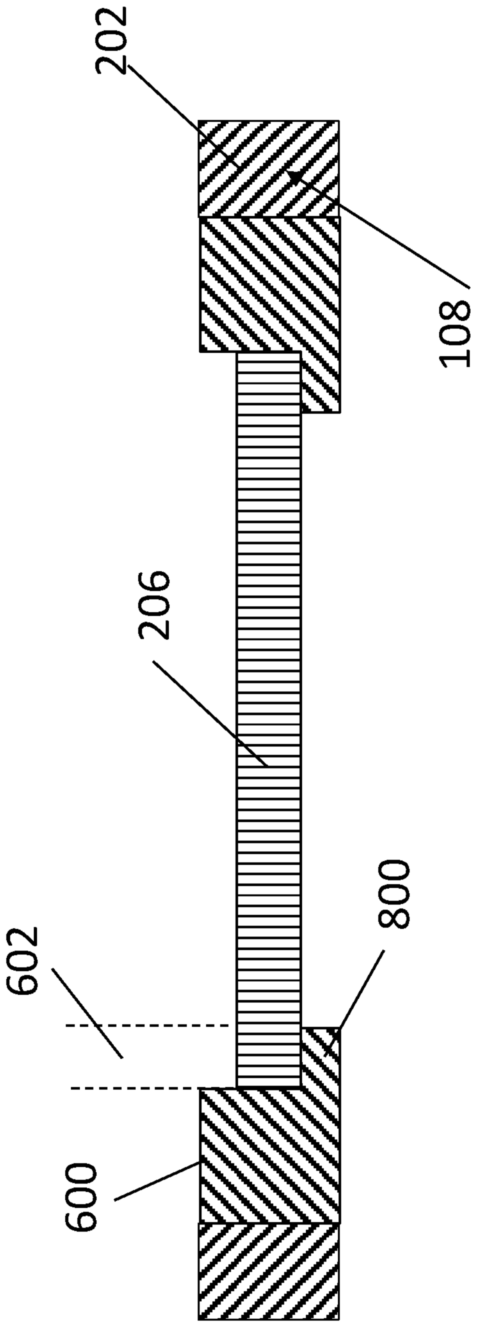
FIG. 8 shows a cross-section view at line A-A of a core in accordance with an alternate third embodiment of the present invention.
Figure 9:
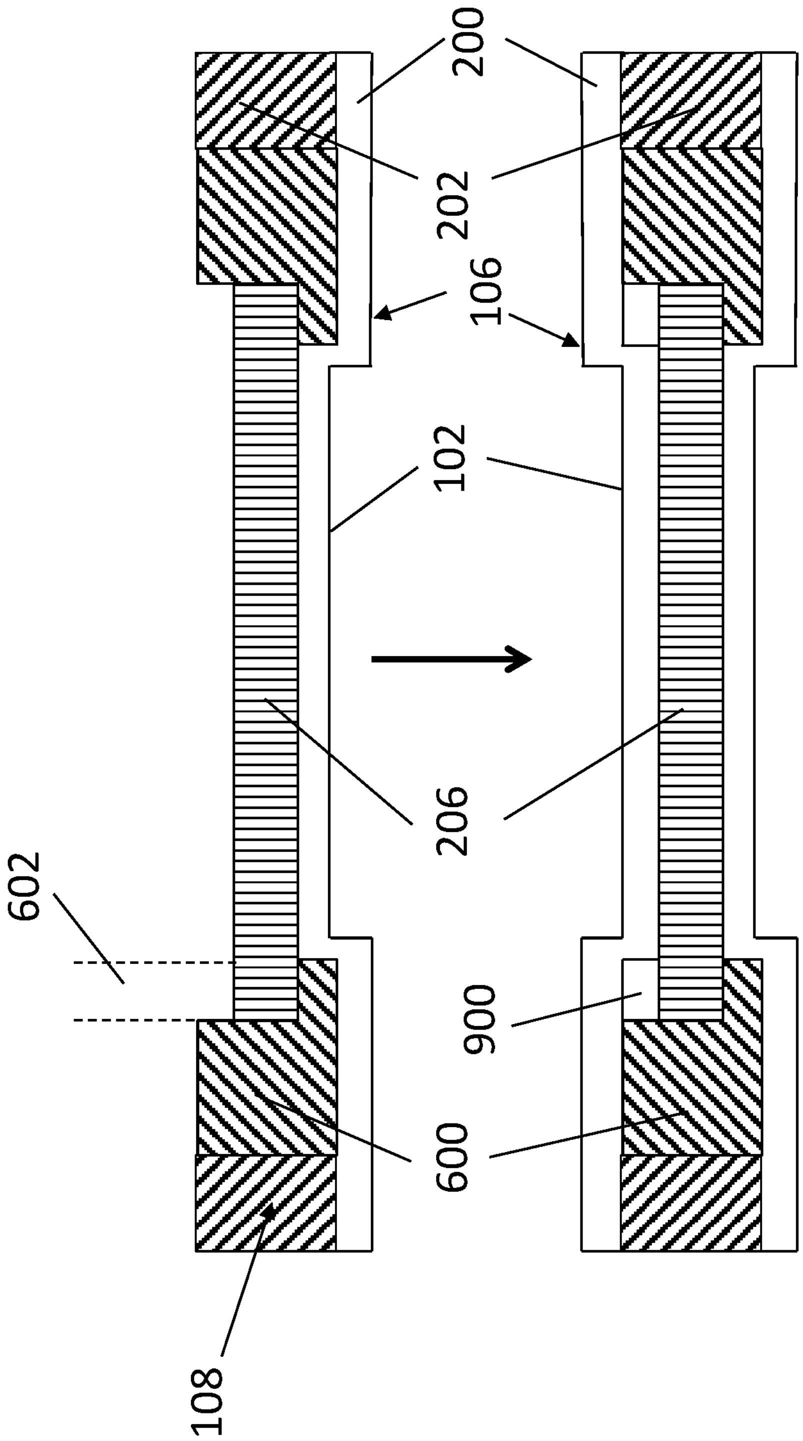
FIG. 9 shows steps in the construction of the shaker door in accordance with an alternate third embodiment of the present invention (cross-section view at line A-A)

In certain applications, the formation of the channel in the filler core material 600 may be costly and inefficient. Instead of a channel 604, the filler core material 600 may alternatively be formed to have an L-shaped cross-section, as best shown in FIG. 8. In this alternate third embodiment, the L-shaped cross-section, which may be formed, e.g. by routing, contains a ledge 800 onto which the overhang 602 of the thin core material 206 sits. With the L-shaped cross-section, however, when the door is assembled, a small void space 900 is formed under one side of the door facing 200, as best illustrated in FIG. 9.

The assembly and materials for this alternate third embodiment is essentially the same as those disclosed above for the third embodiment. In assembly, as best illustrated in FIG. 9, the frame 108, including stiles 202, is first attached to the interior side of a first door facing 200, e.g. by an adhesive. The tiller core materials 600 are then placed over the raised peripheral regions 104 of interior side of the door facing 200 and attached thereto, e.g. by an adhesive. Next, the thin core material 206 is placed over the recessed panel 102, such that its overhangs 602 fit neatly on the ledges 800 of the filler core materials 600. The thin core material 206 may also be attached to the door facing 200 and the filler core material 600, e.g. by an adhesive. Adhesive is then placed over the exposed side of the core materials 206, 600 and the frame. A second door facing 200 is then placed on top of the exposed adhesive and allowed to cure as previously herein described.

Although the drawings and their description above pertains to one-panel shaker doors, the present invention is applicable to shaker door having multiple panels. Shaker doors may also contain more than one panel, for example, two or three panels.

It will be apparent to one of ordinary skill in the art that various modifications and variations can be made in construction or configuration of the present invention without departing from the scope or spirit of the invention. Thus, it is intended that the present invention cover all such modifications and variations, and as may be applied to the central features set forth above, provided they come within the scope of the following claims and their equivalents.

What is claimed is:

1. A shaker door, comprising:

a) a rectangular peripheral frame;

b) two door facings attached to opposite sides of the rectangular frame, wherein each of the door facings is made from a wood composite and contains a raised peripheral region, a transition surrounded by and immediately adjacent to and contiguous with the raised peripheral region, and a planar recessed panel that is surrounded by, immediately adjacent to, and contiguous with the transition, the recessed panel being recessed from the raised peripheral region, the two door facings and the rectangular frame define a cavity therebetween, wherein a first distance between the two door facings at the peripheral region is greater than a second distance between the two door facings at the panel; and c) a core filling the cavity, wherein the core comprises one of:

i) a first core having a first portion at the panel with a first density and second portion with a second density less than the first density, the second portion disposed between the raised peripheral regions, ii) a second core having a first portion having a thickness sufficient to fill the cavity between the panels, the first portion being sandwiched between two filler layers located at the raised peripheral regions, or iii) a third core having a first portion filling a portion of the cavity at the recessed panels and extending beyond the recessed panels, and a second portion filling the remaining cavity at the raised peripheral regions.

2. The shaker door of claim 1, wherein the first density is about 120 to about 250% greater than the second density.

3. The shaker door of claim 1, wherein the first density is about 25 to about 35 lbs/ft$^3$, and the second density is about 13 to about 23 lbs/ft$^3$.

4. The shaker door of claim 1, wherein the first or second portion comprises wheat boards, particleboard, oriented strand board (OSB), plywood, medium density fiberboard (MDF), plywood, stave core, mineral core, or combinations thereof.

5. The shaker door of claim 4, wherein the first portion contains sufficient mineral core so that the door is fire rated.

6. The shaker door of claim 1, wherein the first portion comprises one or more mineral core layers laminated to one or more MDF layers.

7. The shaker door of claim 1, wherein the first portion and the two filler layers of the second core comprise different materials.

8. The shaker door of claim 1, wherein the first portion comprises wheat board.

9. The shaker door of claim 1, wherein the first portion and the filler layers of the second core are adhered together.

10. The shaker door of claim 1, wherein the first portion of the third core extends about 25 to about 50% of the distance between the recessed panel and the frame.

11. The shaker door of claim 1, wherein the second portion contains two different materials.

12. The shaker door of claim 1, wherein the second portion of the third core contains at least one channel into which the first portion is inserted.

13. The shaker door of claim 1, wherein the second portion of the third core contains a paper honeycomb material or corrugated cardboard material immediately above and below the first portion, and particle board filling the remaining volume at the raised peripheral regions.

14. The shaker door of claim 1, wherein the second portion of the third core contains a ledge and the first portion is adhered to the ledge.

15. The shaker door of claim 1, wherein the first portion has a thickness of about 0.370±0.005 inches.

16. The shaker door of claim 1, wherein the second portion has a thickness of about 1.75±0.0625 inches.

17. A method for making a shaker door, comprising the steps of:

a) providing a rectangular frame;

b) attaching a first door facing to one side of the rectangular frame, wherein the first door facing is made from a wood composite and contains a raised peripheral region, a transition surrounded by and immediately adjacent to and contiguous with the raised peripheral region, and a planar recessed panel that is surrounded by, immediately adjacent to, and contiguous with the transition, the recessed panel being recessed from the raised peripheral region;

c) laying a core on to an inner side of the first door facing; and d) attaching a second door facing formed from a wood composite to a second side of the rectangular frame and on top of the core, wherein the second door facing is identical to the first door facing, wherein a first distance between the first and second door skins at the peripheral region is greater than a second distance between the first and second door skins at the panel, wherein the laying step comprises:

i) placing a first portion, having a first density, on an inner surface of the recessed panel, and ii) placing a second portion, having a second density, on the inner surface of the raised peripheral region, wherein the second density is less than the first density and the second portion is thicker than the first portion, or i) placing a first filler layer at an inner surface of the raised peripheral region, ii) placing a first portion, which spans substantially the entire area within the frame, on the first filler layer and an inner surface of the recessed panel, and iii) placing a second filler layer on the middle layer at the raised peripheral region, or i) placing a first portion filling on an inner surface of the recessed panel, wherein the first portion extends beyond an area covered by the recessed panel, and ii) placing a second portion at the raised peripheral region, wherein sections of the first portion that extends beyond the area covered by the recessed panel interlocks with the second portion.

* * * * *